Feb. 18, 1969  G. GLUCHOWICZ  3,427,750
WHEEL MOUNT FOR INTERNAL GRINDING MACHINES
Filed April 5, 1965

Inventor
Gerszon Gluchowicz
Attorney

Feb. 18, 1969          G. GLUCHOWICZ          3,427,750
          WHEEL MOUNT FOR INTERNAL GRINDING MACHINES
Filed April 5, 1965

Inventor
Gerszon Gluchowicz

Attorney

United States Patent Office 3,427,750
Patented Feb. 18, 1969

3,427,750
WHEEL MOUNT FOR INTERNAL GRINDING MACHINES
Gerszon Gluchowicz, Stockholm, Sweden, assignor to Ulvsunda Verkstader Aktiebolag, Bromma, Sweden, a corporation of Sweden
Filed Apr. 5, 1965, Ser. No. 445,589
Claims priority, application Sweden, Apr. 6, 1964, 4,215/1964
U.S. Cl. 51—50    3 Claims
Int. Cl. B24b 41/04, 39/02

ABSTRACT OF THE DISCLOSURE

The grinding wheel spindle is of truncated-conical configuration, with its larger end secured in the tailstock, and with the grinding disc secured to its smaller end. This minimizes undesirable flexing of the spindle during grinding, and permits the use of relatively thick discs, having longer life. The tailstock of the machine is mounted for pivotal movement about a fixed vertical axis, which intersects the axis of the spindle. This permits compensating for wear of the disc. Grinding is effected by movement of the disc axially of the hole to be ground, while effecting relative movement between disc and work in a direction perpendicular to the work axis.

---

This invention relates to internal grinding machines.

More particularly, this invention relates to grinding machines for grinding long or deep holes in workpieces, which machines comprise a headstock or slide for supporting the workpiece, and a tailstock or slide supporting a grinding disc fixed to a rotatable arbor or spindle. These slides are movable relatively one another on supports firstly for grinding the entire length of a hole under reciprocative movement and secondly for effecting a transverse feed movement between the grinding disc and the workpiece. The grinding disc spindle must necessarily become longer as the length of the ground hole increases, and as a result the springiness or resilience of the spindle exposed to the grinding pressure is increased, which has an unfavorable effect on the precision of, and the time required for performing a grinding operation. The grinding is usually carried out so that initially a rough-grinding is done, whereupon the grinding disc is withdrawn from the hole and sharpened by means of a tool, such as a diamond, prior to the performance of the finishing grinding to final dimension. For each ground workpiece the grinding disc undergoes a certain amount of wear, and to prolong the interval between replacement of discs it is desirous that the disc be made initially thick as possible. On the other hand, it is desirable to reduce the deflection or resilience of the grinding spindle by enlarging the diameter thereof which, however, encroaches on the utilizable thickness of the grinding disc, since its minimum diameter still must at least slightly exceed the outer diameter of the spindle. These two considerations are thus in opposition to one another, since a great diameter of the spindle necessarily results in a small thickness of the grinding disc, whereas any increase of the dimension of the latter reduces the allowable diameter of the spindle and thereby increases its tendency to deflect during grinding.

One main object of the invention is to provide a construction in internal grinding machines of the type under consideration which renders possible grinding of long holes with substantially improved efficiency, i.e. great accuracy and shorter grinding times as the result of the spindle having greater stability, while at the same time the grinding disc is capable of having a relatively large radial thickness so as to substantially to reduce the costs for grinding discs.

According to one main feature of the invention a reciprocally movable tailstock carrying the grinding disc is pivotably adjustable about an axis perpendicular to the directions of its reciprocal movement, the wear of the grinding disc being compensated by a turning movement of the tailstock relative to the work support, the diameter of the spindle decreasing from a maximum value adjacent the tailstock toward the grinding disc.

Further objects and advantages of the invention will become apparent from the following description considered in connection with the accompanying drawings, which form part of the specification, and of which:

Figure 1:
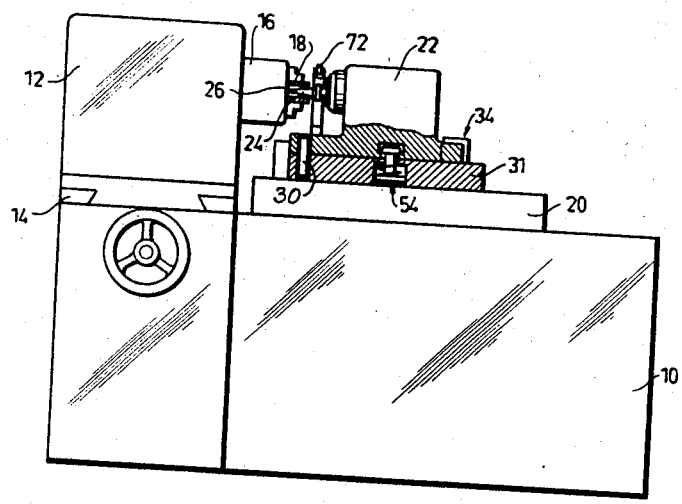
FIG. 1 is a partially sectional, lateral elevation of a grinding machine constructed according to the invention.
Figure 2:
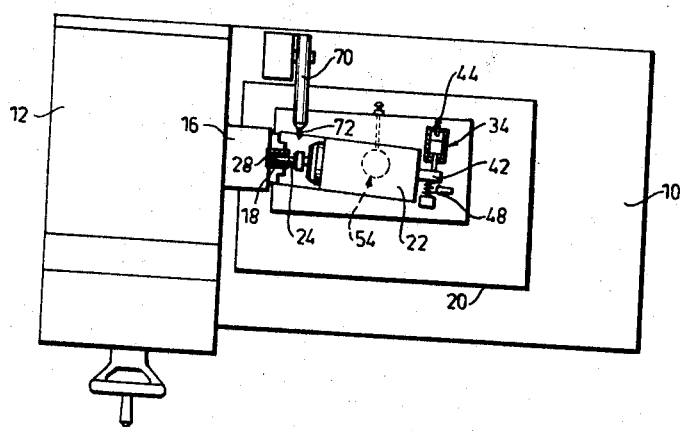
FIG. 2 is a top view of the machine.
Figure 3:
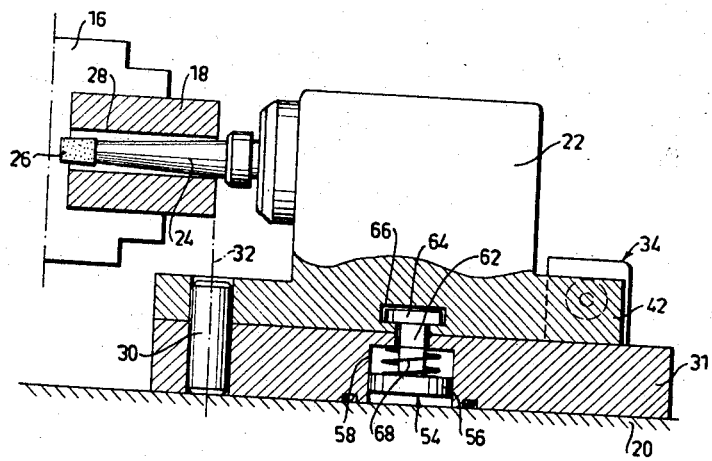
FIG. 3 is a fragmentary elevational view of the machine partially in section and represented on an enlarged scale.

Referring to the drawings, reference numeral 10 denotes a frame on which a headstock 12 is movably guided in transverse direction by means of guides 14. The headstock has a chuck 16 for attaching a workpiece 18 to be ground. Provided on a table 20 is a tailstock 22, which supports a rotatable spindle or arbor 24, the free end of which carries a grinding disc 26 fixed thereonto. The table 20, together with the tailstock 22 is mounted in known manner for reciprocating movement during which the grinding disc 26 works on the elongated hole 28 in the workpiece 18. The headstock 12 together with the workpiece 18 are arranged by guides 14 to perform a feed movement transverse of table 20 perpendicularly to said reciprocative movement for grinding the wall of the hole 28 to a predetermined diameter.

Figure 4:
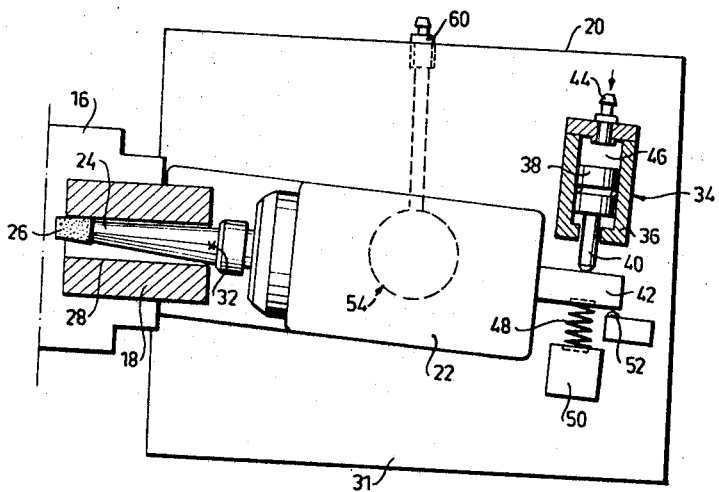
FIG. 4 is a fragmentary plan view of the portion of the machine shown in FIG. 3 with parts presented in section.

According to the invention the tailstock 22 is mounted turnably about a pivot 30, which is fixed in a plate 31 that is rigidly secured to the table 20, and the axis 32 of which is vertical and intersects the horizontal axis of the grinding spindle 24 at a point located approximately at that place where the spindle enters the hole 28 in the longest occurring workpiece 18. The point of intersection of said two axes is thus positioned immediately outside the place of rigid attachment of the spindle 24 the tailstock 22. The tailstock 22 is turned about the pivot 30 by means of a servo unit 34, comprising a piston 38 disposed within a cylinder 36 (FIG. 4), and a piston rod 40 adapted to act upon a projection 42 formed on the tailstock 22. The servo unit 34 is connected by a conduit 44 with a source (not shown) of a pressure fluid such as oil. By supplying pressure fluid to the space 46 behind the piston 34 the piston rod 40 thereof is advanced toward the projection 42 causing the tailstock 22 to be turned about the axis 32 of the pivot 30. This turning movement is effected against the action of a spring member 48, which is disposed between the projection 42 and a shoulder 50 formed on the plate 31. A limit switch 52 defines the greatest angle which the central axis of the spindle 24 can assume in relation to the central axis of the workpiece 18. The tailstock 22 is locked in a desired angular position by means of a servo unit 54, which comprises a piston 56 axially movable within a chamber 58 into which pressure fluid is fed connected by a conduit 60. The piston 56 is through a piston rod 62 with a flange 64 located in a groove 66 formed at the base side of the tailstock 22. By supplying pressure fluid through the conduit 60 the piston 56 is caused to press the flange 64 downwardly against the resistance of a tension spring member 68 so as frictionally to lock the tailstock 22. This locking step is performed after the tailstock has been turned about the pivot 30 to a predetermined angular position.

The spindle or arbor 24 has a frustro-conical shape with increasing diameter from the grinding disc 26 towards the place of its attachment on the tailstock 22. This diameter may, at the tailstock 22, be only slightly less than the diameter of the hole 28. For this reason the spindle becomes highly stable with its deflection under the action of the grinding pressure thus being reduced to a minimum. Also, the outer diameter of the spindle 24 adjacent the grinding disc 26 can be reduced, so as to allow a corresponding increase in the radial thickness of the grinding disc at the free end of the spindle, whereby a correspondingly considerable increase in the life of the grinding disc is made possible without reducing the spindle stiffness to any appreciable degree.

A grinding operation is conducted in such a manner that the rotating grinding disc 26 reciprocates within the hole 28 while simultaneously the headstock 12 is fed in the transverse direction. After an initial rough grinding the grinding disc 26 is withdrawn from the hole 28 in the usual manner. By means of a tool 70 and a diamond tip 72 provided thereon, a sharpening of the grinding disc is effected before it is returned into the hole 28 for performing the final finishing grinding to the predetermined dimension of the hole 28.

For each workpiece some wear of the grinding disc 26 is encountered; and this wear is compensated by turning the tailstock 22 about the axis 32 of pivot 30. The grinding disc has at the outset, when the central axes of the hole 28 and the spindle 24 coincide, a cylindrical form with an external diameter less than that of the hole. Thereafter the grinding disc, due to the wear caused friction by frictional engagement with the workpiece and the repeated sharpening operations by the diamond tip 72 assumes a more or less conical form, the generatrix of the disc bearing against the wall of the hole 28 remaining, however, always parallel in relation to a generatrix of the cylindrical surface of the wall of the hole.

Prior to each sharpening step the tailstock 22 is turned a small part of a revolution about the pivot 30 by means of the servo unit 34 and locked in the new position by means of the servo unit 54. Hereby the abovementioned generatrix of the grinding disc is inclined relatively to the generatrix of the wall of the hole, but the sharpening of the grinding disc 26 by means of the diamond 72 will always restore the parallelism. The subsequent finishing grinding step is thus always effected under exactly correct conditions. Due to this continuous turning movement the grinding disc 26 can be utilized until its outer diameter adjacent the spindle 24 is only slightly greater than the diameter of the latter. Due to its form the spindle 24 becomes highly insensitive to the grinding pressure which thereby can be kept relatively high while high accuracy is obtained so that the working time becomes short. Furthermore, the grinding disc can be utilized to a substantially greater extent than hitherto before a replacement must be effected, and the costs for the grinding discs are reduced in a corresponding degree.

For the realization of the invention it is unimportant which of the two slides, the headstock 12 and the tailstock 22, performs the reciprocating transverse feed movement.

While one more or less specific embodiment of the invention has been shown and described, it is to be understood that this is for purpose of illustration only and that the invention is not to be limited thereby, but its scope is to be determined by the appended claims.

What I claim is:

1. An internal grinding machine for grinding the cylindrical bore of a workpiece, comprising
   a headstock for supporting a workpiece,
   a tailstock,
   a spindle rotatably mounted on said tailstock for rigidly supporting a grinding wheel thereon,
   said head and tail stocks being reciprocable relative to one another axially of the bore of the workpiece and at right angles to the axis of said bore to effect grinding of the workpiece along its bore and to the required extent radially of its bore,
   said spindle being conical in shape and having its maximum diameter adjacent said tailstock,
   means mounting said tailstock for pivotal adjustment about an axis perpendicular to the directions of the reciprocation of said head and tail stocks and disposed in a plane perpendicular to the axis of said spindle and between the large and small ends of the spindle and close to the large end of said spindle, so that wear of the grinding wheel can be compensated by angular adjustment of said tailstock about the axis of pivotal adjustment, and so that a generatrix of the grinding surface of said wheel will remain parallel to the axis of said bore,
   said axis of pivotal adjustment being so located that the large end of said spindle does not contact the workpiece even when the periphery of the grinding disc is worn down to approximately the same diameter as that of the adjacent small end of said spindle.

2. An internal grinding machine as claimed in claim 1, wherein said axis of pivotal adjustment intersects the axis of said spindle.

3. An internal grinding machine as claimed in claim 2, having fluid pressure operated means for effecting adjustment of said tailstock about said axis of pivotal adjustment,
   fluid-pressure operated means for locking said tailstock in any adjusted position, and
   means for limiting the amount of adjustment of said tailstock about said axis of pivotal adjustment under actuation of the first-named fluid-pressure operated means.

References Cited

UNITED STATES PATENTS

| | | | |
|---|---|---|---|
| 2,039,711 | 5/1936 | Einstein | 51—95 |
| 2,414,182 | 1/1947 | Wessman | 51—95 X |
| 2,442,683 | 6/1948 | Green | 51—50 |
| 2,612,008 | 9/1952 | Kuniholm | 51—95 X |
| 2,647,348 | 8/1953 | Hahn | 51—50 |
| 2,680,941 | 6/1954 | Hahn. | |

JAMES L. JONES, JR., *Primary Examiner.*

U.S. Cl. X.R.

51—95